Aug. 18, 1964   J. P. FELBURN   3,145,045
ANIMAL HAULING VEHICLES
Filed Sept. 11, 1962   2 Sheets-Sheet 1
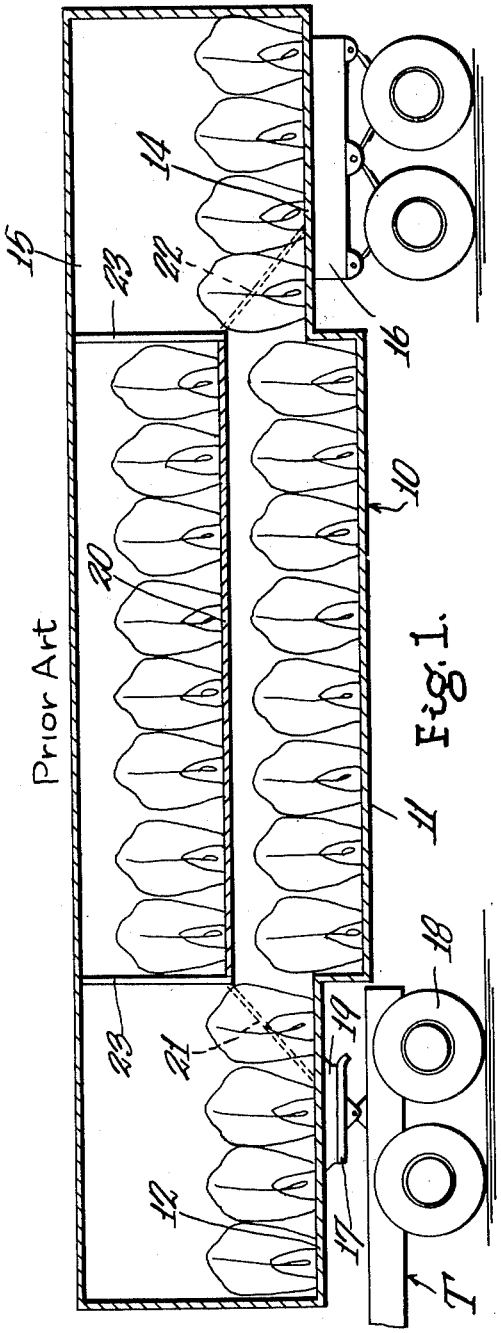
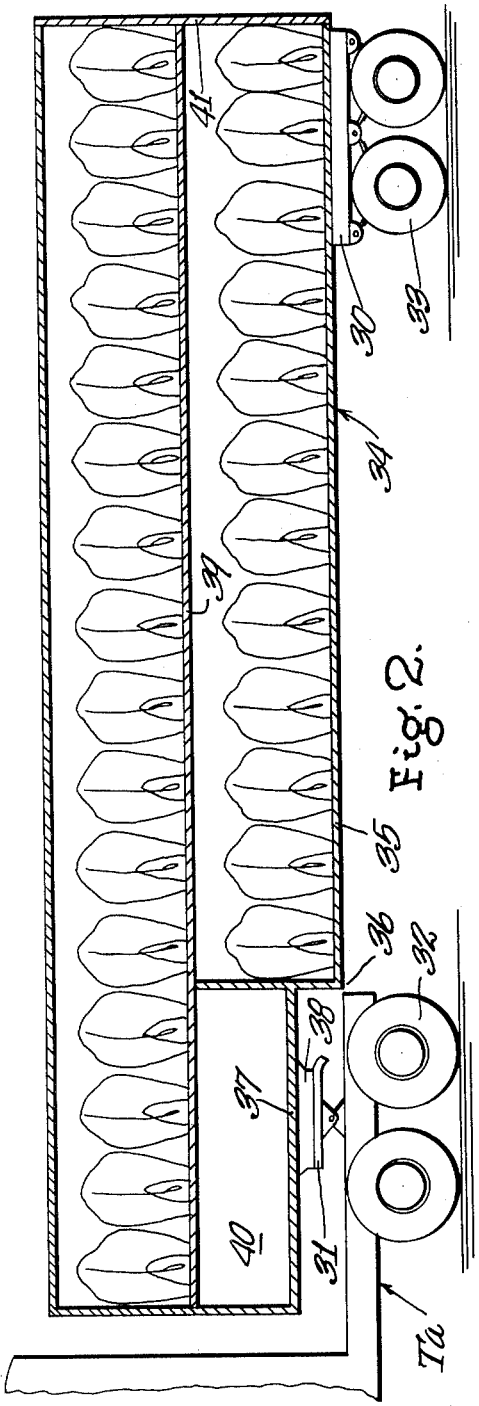
INVENTOR.
JOHN PHIL FELBURN
BY
*Williams and Kreske*
ATTORNEYS Aug. 18, 1964 J. P. FELBURN 3,145,045
ANIMAL HAULING VEHICLES
Filed Sept. 11, 1962 2 Sheets-Sheet 2
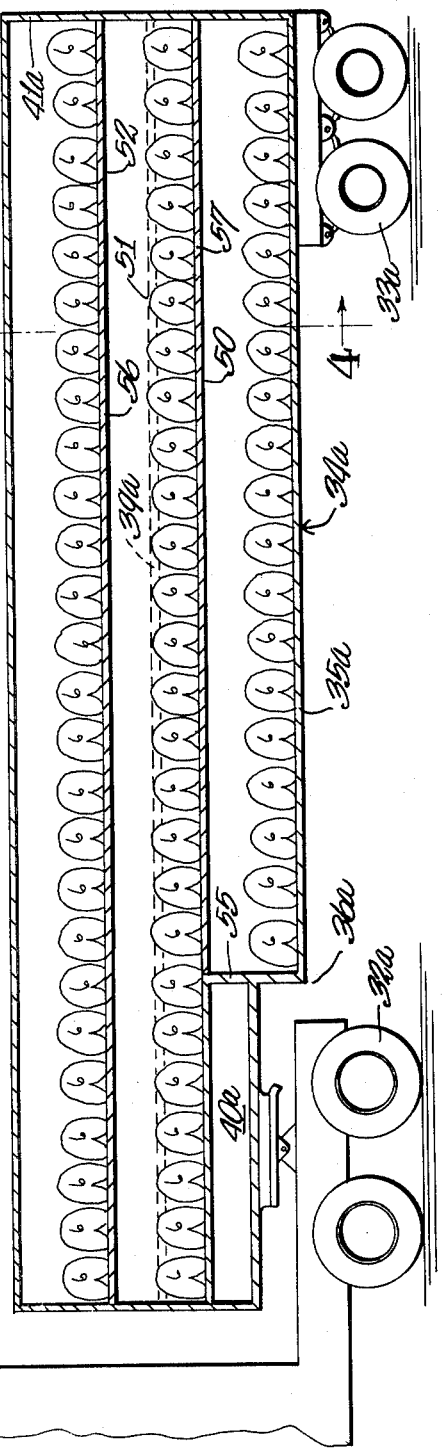
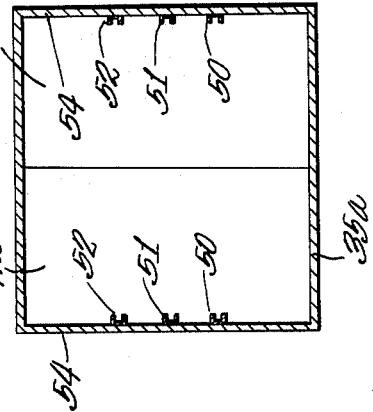
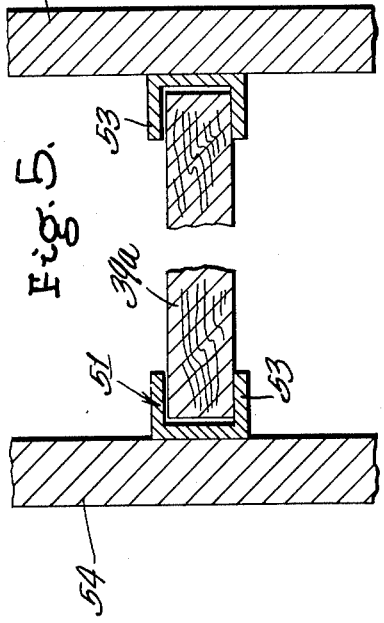
INVENTOR.
JOHN PHIL FELBURN
BY
Williams and Kaske
ATTORNEYS

United States Patent Office 3,145,045
Patented Aug. 18, 1964

3,145,045
ANIMAL HAULING VEHICLES
John Phil Felburn, 4160 W. Broad St., Columbus, Ohio
Filed Sept. 11, 1962, Ser. No. 222,809
1 Claim. (Cl. 296—24)

My invention relates to animal hauling vehicles, more particularly to a tractor-trailer rig for hauling animals such as cattle, hogs, sheep and the like, and the principal object of my invention is to provide new and improved vehicles of this type.

Prior art animal hauling vehicles have been deficient in numerous respects. For example, it has heretofore been difficult and time consuming to load the animals into and unload them from a trailer, and the trailer has been so designed that considerable payload space has been wasted. Further, complicated mechanisms were heretofore used in the loading and unloading procedure, and such mechanisms not only increased the initial cost of the trailer but subsequently presented maintenance problems. Also, in the prior art, the animals were not carried to provide the ultimate with respect to lowering the center of gravity and therefore the trailers were more subject to over-turning with consequent damage to the load.

My invention overcomes these and other disadvantages, as will be apparent from a reading of this specification taken in connection with the appended drawings. In the drawings accompanying this specification and forming a part thereof, there is shown, for purpose of illustration, an embodiment which my invention may assume, and in these drawings:

FIGURE 1 is a schematic longitudinal sectional view of a prior art animal hauling trailer, commonly called a "possum belly" trailer, the hauling tractor being fragmentarily shown, FIGURE 2 is a view similar to FIGURE 1 but showing a presently preferred emobdiment of my invention, FIGURE 3 is a view similar to FIGURE 2 but showing the embodiment of my invention adapted for hauling smaller animals, FIGURE 4 is a sectional view corresponding generally to the line 4—4 of FIGURE 3, with the animal platforms removed, and FIGURE 5 is an enlarged fragmentary sectional view showing a detail of FIGURE 3.

The "possum belly" trailer shown in FIGURE 1 has been commonly used heretofore to haul large animals, such as cattle. Such trailer had a bed 10 formed with a flat center section 11 and flat elevated sections 12 and 14 at the front and rear ends of the trailer.

A van body 15 extended upwardly from the bed 10 and cooperated therewith to provide an enclosure for the animals. The van body is formed with suitable openings (such as slotted sides) to provide ventilation for the animals. The rear of the trailer is supported on a wheel bogey 16 and the front of the trailer is supported upon and connected to the usual fifth wheel 17 of a conventional road hauling tractor T. The tractor is provided with the usual road engaging wheels, the rear wheels 18 underlying the fifth wheel as shown. The lower surface of the front elevated portion 12 of the bed is provided with a fifth wheel plate 19, and king pin (not shown), for cooperation with the tractor fifth wheel 17.

Normally the bed section 11 is about twice as long as each of the end sections 12 and 14 and thus if each end section is ten feet long, the center bed section 11 is twenty feet long. In the hauling of large animals, such as cattle, it was attempted to support a predetermined number of animals (such as the four shown) on each end section 12 and 14. However, the loading of these animals presented such a problem (as will be apparent hereinafter) that frequently less than such predetermined number were loaded.

In the usual "possum belly" trailer, a platform 20 is supported in vertically spaced, parallel relation above the center section 11. In trailer constructions wherein the platform was fixed against vertical movement, the cattle had to either be side loaded upon the end sections 12 and 14, which required large and costly doors at the side of the trailer, or the cattle had to be moved up and down ramps 21 and 22 (shown in dotted lines in FIGURE 1) to fill the end sections 12 and 14 and the platform 20. Also, some sort of movable barriers 23, 23 had to be disposed between the end sections and the platform 20 to keep the cattle at the ends of the platform from falling into the end sections 12 and 14, and yet not interfere with loading and unloading operations.

The ramps presented a considerable loading problem since cattle are not inclined to move up and down over the necessarily sharply inclined ramps, and further some means had to be provided to swing the ramps out of the way to accommodate the full load of cattle on each end section 12 and 14. This loading problem was so great that usually at least one animal was omitted from each end section 12 and 14 and therefore the pay load was thus decreased.

To avoid the ramp problem, some prior trailer constructions had the platform 20 supported for vertical movement so that it could be lowered to the level of the end sections 12 and 14, whereby the cattle could be loaded from the rear end of the trailer (through suitable doors, not shown) and pass inwardly over rear end section 14, the lowered platform 20, and to the front section 12, and sufficient cattle were thus end loaded to fill the section 12 and platform 20. Thereafter, the platform was raised to its position shown in FIGURE 1. Cattle were then end loaded to fill the rear end section 14, and the center section 11 was side loaded. It will be appreciated that this trailer construction posed many problems from both manufacturing and operating standpoints and thus did not present a practical solution.

In contrast, my invention, as disclosed in the embodiment shown in FIGURE 2, provides a satisfactory solution to the problem since the trailer is less expensive to manufacture and maintain, loading and unloading of the animals is a relatively easy matter and accomplished from the rear end of the trailer, pay load is increased, and the center of gravity of the trailer is lowered, thus providing greater safety in operation.

Referring to FIGURE 2, the trailer therein shown has a wheel bogey 30 supporting its rear portion. The front portion of the trailer is supported on the fifth wheel 31 of a road hauling tractor Ta. It is to be noted at this time that the rear wheels 32 of the tractor are larger than the wheels 33 of the bogey 30.

The trailer comprises a major body portion, including bed or floorline 34 which has a long, flat portion 35 extending horizontally from the rear end of the trailer to a point or place 36 short of the front end of the trailer, at which point the bed has an elevated floorline portion 37 which extends along a minor body portion to the front end of the trailer. The elevated portion 37 is in the form of an upward step to clear the rear wheels 32 of the tractor and to support a fifth wheel plate 38, and king pin (not shown), for cooperation with the tractor fifth wheel 31.

The bed portion 35, as before mentioned, is long and flat and horizontally disposed, and is formed as a fixed part of the trailer and thus held against vertical movement with respect to adjoining parts of the trailer, either as a whole or any section thereof, and the bed portion is adapted to support a lower tier of animals all on one level. If the trailers of FIGURES 1 and 2 are made of comparable size, the bed portion 35 will support at least as many animals as was supported in the section 11 and rear section 14 of the trailer shown in FIGURE 1.

A flat platform 39 is disposed within the trailer in position above and generally parallel to the bed portion 35, and since my invention makes easy end loading of the animals possible, the platform may be fixed against vertical movement either as a whole or as any section thereof, to thus avoid the costly elevating mechanism required in some of the prior art cattle haulers.

The flat platform 39 extends completely from the rear end to the front end of the trailer to thereby overlie both the flat section 35 and elevated portion 37 of the bed, as clearly seen in FIGURE 2. The platform 39 is adapted to support an upper tier of animals all on one level and comparison with FIGURE 1 will show that a full load of animals from front to rear of the trailer is possible, thus picking up an additional number of animals as represented by the additional upper space which is of the same length as the rear section 14 of the trailer shown in FIGURE 1.

The wheels 33 of the trailer shown in FIGURE 2 are smaller than those shown in FIGURE 1 so as not to increase the overall height of the trailer and to lower its center of gravity. A space 40 is formed between the bed portion 37 and platform 39 and may be utilized for storage purposes.

The rear of the trailer may have doors 41 which open to provide for loading and unloading of the animals. The fact that both lower and upper tiers are level eliminates the need of any interior ramps (such as the ramps 21, 22) and also eliminates the need of vertically moving the platform 39. Loading end ramps (not shown) communicating with the rear of the lower and upper tiers, are located outside of the trailer and may be longer and their incline more gradual. In some cases where the animals are loaded from or unloaded onto a dock, the end ramps may be omitted.

The trailer of my invention is flexible in that it may be quickly altered to haul either large animals, such as cattle, or smaller animals, such as hogs and sheep. Referring to FIGURE 3, the trailer is substantially like that disclosed in FIGURE 2 and corresponding parts will bear the same reference numerals supplemented by the suffix "a."

In the trailer of FIGURE 3, three pairs of tracks 50, 51 and 52 are arranged in vertically spaced relation and above the bed portion 35a, the tracks 51, 52 extending completely from the front to the rear of the trailer, whereas the tracks 50 terminate adjacent a horizontal floor panel of a box-like portion 55 which defines the storage space 40a. Each of the tracks may be formed by cooperating channels 53, 53 secured in facing relation to the opposite sides 54, 54 of the van body, as shown in FIGURE 5.

The tracks 51 are adapted to support a platform 39a to provide the same vertical spaces between bed section 35a and platform 39a, and between platform 39a and the roof of the van, as was provided in the bi-level trailer of FIGURE 2, and the trailer of FIGURE 3 in this relation is adapted to haul large animals such as cattle. The platform 39a comprises a plurality of platform elements, preferably made up of series of planks which are slid along the tracks 51 from the rear of the trailer until the entire platform is provided.

The planks forming the platform 39a may be removed from the tracks 51 and stored within the space 40a so that the interior of the van is free of platforms from bed to roof, to accommodate extraordinarily large animals or loads of other nature. Or, the removed planks may be assembled in the tracks 52 to form an upper platform 56 and additional planks may be inserted into the tracks 50 to form a lower platform 57 which is level with the upper surface panel of the box-like portion 55, as shown in FIGURE 5. Thus, three tiers are formed within the van body for hauling animals of a smaller size, such as hogs or sheep.

In view of the foregoing, it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

A semi-trailer having interchangeable floor platforms providing a bi-level or a tri-level vehicle of maximum animal hauling capacity comprising, a van body having a major portion thereof of transverse rectangular cross-section throughout the length thereof and terminating in a forward vertical wall extending one-third the height of said body, a ground-engaging wheel assembly mounted upon said van body major portion and disposed entirely externally thereof, said van body forwardly of said wall having a remaining minor portion thereof of transverse rectangular cross-section having a lesser area than that of said major portion, said minor body portion being co-extensive in width and having a co-planar roofline with said major body portion, and having a floorline parallel with and upwardly offset from the floorline of said major body portion a distance less than one-third the height of said major body portion, said minor body portion floorline having means thereon for accommodating the rear portion of a tractor to which the semi-trailer is connected, a horizontal floor panel within said minor body portion extending longitudinally thereof at the level of the upper end of said wall to define with said minor body portion floorline therebeneath a storage space therebetween, three pairs of tracks secured in parallel vertically spaced relation to the side walls of said van body, of which a first pair is disposed midway of the height of said major body portion, and the second and third pairs are disposed respectively at one-third and two-thirds of the height thereof, said first and third track pairs extending the full length of said van body, and said second track pair extending the length of said major body portion to terminate adjacent said panel, and a plurality of platform elements removably engageable with either said first pair of tracks to define a bi-level van body for hauling relatively larger animals, or with said second and third pairs of tracks to define a tri-level van body for hauling relatively smaller animals wherein said panel forms a substantially co-planar extension of the platform elements associated with said second track pair, whereby in either bi-level or tri-level form, the entire van body length is available for hauling animals on level platform floors, and the entire length and width of said major portion thereof is available for hauling animals at said floor line thereof, while providing internal storage space for unused platform elements, to thereby maximize the carrying capacity of the semi-trailer.

References Cited in the file of this patent

UNITED STATES PATENTS

| | | |
|---|---|---|
| 876,774 | Crepar | Jan. 14, 1908 |
| 1,824,225 | Mitchell | Sept. 22, 1931 |
| 2,117,577 | Simning | May 17, 1938 |
| 2,256,037 | Reid | Sept. 16, 1941 |